(12) United States Patent
Wang et al.

(10) Patent No.: US 10,761,637 B2
(45) Date of Patent: Sep. 1, 2020

(54) PRESSURE SENSING DETECTION CIRCUIT AND DRIVING METHOD THEREOF, ELECTRONIC DEVICE

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Chih Jen Cheng, Beijing (CN); Yanling Han, Beijing (CN); Ping Zhang, Beijing (CN); Xueyou Cao, Beijing (CN); Wei Liu, Beijing (CN); Yuzhen Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 148 days.

(21) Appl. No.: 15/918,325

(22) Filed: Mar. 12, 2018

(65) Prior Publication Data
US 2019/0042043 A1 Feb. 7, 2019

(30) Foreign Application Priority Data
Aug. 3, 2017 (CN) .......................... 2017 1 0655388

(51) Int. Cl.
*G06F 3/045* (2006.01)
*G06F 3/041* (2006.01)
*G06F 3/044* (2006.01)
*G01L 1/18* (2006.01)

(52) U.S. Cl.
CPC ............ *G06F 3/0414* (2013.01); *G06F 3/044* (2013.01); *G06F 3/0412* (2013.01); *G01L 1/18* (2013.01)

(58) Field of Classification Search
CPC ...... G06F 3/0414; G06F 3/044; G06F 3/0412; G01L 1/18
See application file for complete search history.

(56) References Cited

U.S. PATENT DOCUMENTS

| | | | |
|---|---|---|---|
| 2013/0009905 A1* | 1/2013 | Castillo ................. | G06F 3/0414 345/174 |
| 2015/0002452 A1* | 1/2015 | Klinghult .............. | G06F 3/0416 345/174 |
| 2015/0324052 A1* | 11/2015 | Lee ........................ | G06F 3/0416 345/173 |
| 2016/0306481 A1* | 10/2016 | Filiz ....................... | G06F 3/0416 |
| 2016/0313846 A1* | 10/2016 | Hong ..................... | G06F 3/0416 |
| 2017/0031504 A1* | 2/2017 | Hwang ................. | G06F 3/0416 |
| 2017/0356812 A1* | 12/2017 | Madden ................. | G06F 3/044 |
| 2017/0356815 A1* | 12/2017 | Madden ................ | G06F 3/0414 |

\* cited by examiner

*Primary Examiner* — Adam J Snyder
(74) *Attorney, Agent, or Firm* — Dilworth & Barrese, LLP.; Michael J. Musella, Esq.

(57) ABSTRACT

A pressure sensing detection circuit and a driving method thereof, an electronic device. The pressure sensing detection circuit includes: an excitation signal circuit, configured to output an alternating current voltage signal; a pressure sensing circuit, configured to sense a magnitude of an external pressure and output a detection voltage signal under excitation of the alternating current voltage signal; and a phase detection circuit, configured to detect a phase change value of the detection voltage signal and convert the phase change value into a voltage value.

15 Claims, 9 Drawing Sheets

PRESSURE SENSING DETECTION CIRCUIT AND DRIVING METHOD THEREOF, ELECTRONIC DEVICE

The present application claims priority of the Chinese patent application No. 201710655388.2, filed on Aug. 3, 2017, the disclosure of which is incorporated herein by reference as part of the application.

TECHNICAL FIELD

At least one embodiment of the present disclosure relates to a pressure sensing detection circuit and a driving method thereof, an electronic device.

BACKGROUND

Pressure sensing technology is a technology which can detect external pressure, and this technology has been widely applied in industrial control, healthcare, and other fields. At present, those skilled in the related art are actively studying the application of pressure sensing technology in mobile electronic display devices such as mobile phones, tablet computers and the like to improve touch accuracy and achieve more various functions.

At present, most of display devices have integrated with touch panels to realize touch functions. However, for instance, a capacitive touch panel can only determine the position touched by a user, cannot determine the magnitude of the user's pressing action, and this brings limitations to further development and application of touch control.

SUMMARY

At least one embodiment of the present disclosure provides a pressure sensing detection circuit, which comprises: an excitation signal circuit, configured to output an alternating current voltage signal; a pressure sensing circuit, configured to sense a magnitude of an external pressure and output a detection voltage signal under excitation of the alternating current voltage signal; and a phase detection circuit, configured to detect a phase change value of the detection voltage signal and convert the phase change value into a voltage value.

For instance, in the pressure sensing detection circuit provided in one embodiment of the present disclosure, the pressure sensing circuit comprises a first voltage input terminal, a second voltage input terminal, a detection voltage output terminal, a pressure sensitive resistor, and a capacitor, wherein a first terminal of the pressure sensitive resistor is connected to the first voltage input terminal, a first terminal of the capacitor is connected to the second voltage input terminal, a second terminal of the pressure sensitive resistor, a second terminal of the capacitor are connected to a first node, and the detection voltage output terminal outputs the detection voltage signal.

For instance, in the pressure sensing detection circuit provided in one embodiment of the present disclosure, the detection voltage output terminal is connected to the first node.

For instance, in the pressure sensing detection circuit provided in one embodiment of the present disclosure, the pressure sensing circuit further comprises a switch circuit, a first terminal of the switch circuit is connected to the first node, a second terminal of the switch circuit is connected to the detection voltage output terminal, and a control terminal of the switch circuit is configured to receive a control signal.

For instance, in the pressure sensing detection circuit provided in one embodiment of the present disclosure, the excitation signal circuit comprises an excitation source, an inversion circuit, a first voltage output terminal and a second voltage output terminal, the excitation source is configured to output an excitation alternating current voltage signal, the first voltage output terminal outputs a first alternating current voltage signal to the first voltage input terminal, an input terminal of the inverter circuit is connected to the excitation source, an output terminal of the inverter circuit is connected to the second voltage output terminal so as to output a second alternating current voltage signal, and the second voltage output terminal is connected to the second voltage input terminal.

For instance, in the pressure sensing detection circuit provided in one embodiment of the present disclosure, the inversion circuit comprises a first operational amplifier, a first resistor and a second resistor, a first terminal of the first resistor is connected to the excitation source, and a second terminal of the first resistor, a first terminal of the second resistor and an inverting input terminal of the first operational amplifier are connected to a second node, the second terminal of the second resistor is connected to an output terminal of the first operational amplifier, a non-inverting input terminal of the first operation amplifier is grounded, and an output terminal of the first operation amplifier is connected to the second voltage input terminal.

For instance, in the pressure sensing detection circuit provided in one embodiment of the present disclosure, the excitation signal circuit further comprises a second operational amplifier, a non-inverting input terminal of the second operational amplifier is connected to the excitation source, an inverting input terminal of the second operational amplifier is connected to a output terminal of the second operational amplifier, and the output terminal of the second operational amplifier is connected to the first voltage input terminal.

For instance, in the pressure sensing detection circuit provided in one embodiment of the present disclosure, the excitation signal circuit comprises an excitation source and a voltage output terminal, the excitation source is configured to output an excitation alternating current voltage signal to the voltage output terminal, the voltage output terminal is connected to the first voltage input terminal, and the second voltage input terminal is grounded.

For instance, in the pressure sensing detection circuit provided in one embodiment of the present disclosure, the excitation signal circuit further comprises a third operational amplifier, a non-inverting input terminal of the third operational amplifier is connected to the excitation source, an inverting input terminal of the third operational amplifier is connected to an output terminal of the third operational amplifier, and the output terminal of the third operational amplifier is connected to the first voltage input terminal.

For instance, the pressure sensing detection circuit provided in one embodiment of the present disclosure further comprising a fourth operational amplifier, a non-inverting input terminal of the fourth operational amplifier is connected to the detection voltage output terminal, an inverting input terminal of the fourth operational amplifier is connected to an output terminal of the fourth operational amplifier, and the output terminal of the fourth operational amplifier is connected to an input terminal of the phase detection circuit.

For instance, in the pressure sensing detection circuit provided in one embodiment of the present disclosure, the phase detection circuit comprises a comparator shaping circuit, a phase discriminator and a filter circuit which are cascaded.

For instance, in the pressure sensing detection circuit provided in one embodiment of the present disclosure, the comparator shaping circuit comprises a hysteresis comparator, the phase discriminator comprises an exclusive-or gate, and the filter circuit comprises a low pass filter.

At least one embodiment of the present disclosure provides an electronic device, comprising the pressure sensing detection circuit according to any one of the embodiments of the present disclosure.

For instance, the electronic device provided in one embodiment of the present disclosure further comprising a display panel, a scan driving circuit and a pressure sensing detection driving circuit, the pressure sensing circuit comprises a first voltage input terminal, a second voltage input terminal, a detection voltage output terminal, a pressure sensitive resistor, a capacitor, and a switch circuit, a first terminal of the pressure sensitive resistor is connected to the first voltage input terminal, a first terminal of the capacitor is connected to the second voltage input terminal, a second terminal of the pressure sensitive resistor, a second terminal of the capacitor are connected to a first node, and the detection voltage output terminal outputs the detection voltage signal, a first terminal of the switch circuit is connected to the first node, a second terminal of the switch circuit is connected to the detection voltage output terminal, a control terminal of the switch circuit is configured to receive a control signal, the pressure sensing circuit is distributed in an array in the display area of the display panel, a control terminal of the switch circuit is connected to the scan driving circuit, the detection voltage output terminal is connected to the pressure sensing detection driving circuit.

For instance, the electronic device provided in one embodiment of the present disclosure further comprising at least one gate line, the control terminal of the switch circuit is connected to the at least one gate line.

At least one embodiment of the present disclosure provides a method of driving the pressure sensing detection circuit provided in at least one embodiment of the present disclosure, comprising: providing the alternating current voltage signal; the pressure sensing circuit senses the external pressure and output the detection voltage signal under excitation of the alternating current voltage signal; and converting the phase change value of the detection voltage signal into the voltage value.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
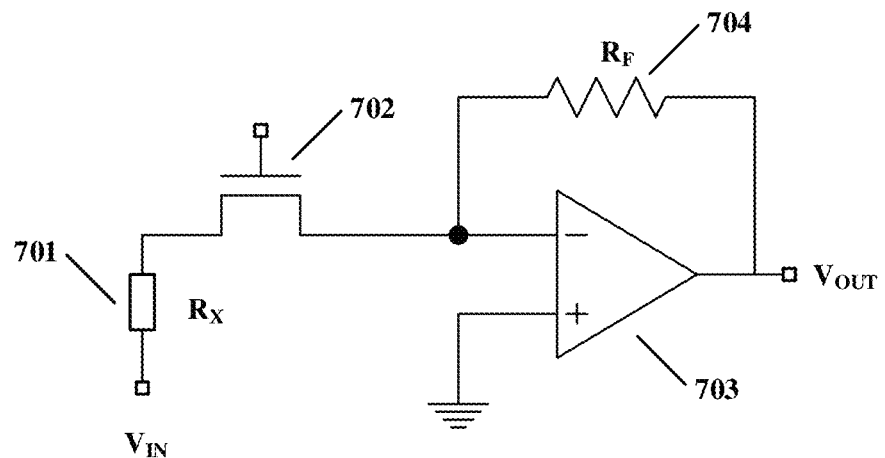
FIG. 1 is a circuit diagram of a pressure sensing detection circuit.

For instance, as illustrated in FIG. 1, a pressure sensing detection circuit comprises a piezoresistive sensor 701, a transistor switch 702, an operational amplifier 703, and a resistor 704. For instance, the resistance of the piezoresistive sensor 701 is denoted as $R_X$ (this value varies with an applied external pressure), the resistance of the resistor 704 is denoted as $R_F$, an input voltage is denoted as $V_{IN}$, and a detection voltage is denoted as $V_{OUT}$, the detection voltage $V_{OUT}=R_F/R_X \times V_{IN}$, so that the change of the resistance $R_X$ can be obtained by detecting the change of the voltage $V_{OUT}$, and then the magnitude of the external pressure applied on the piezoresistive sensor can be calculated according to the relationship between the resistance $R_X$ and the applied pressure. For instance, the piezoresistive sensor 701 can comprise a pressure sensitive resistor. Because the detection of the piezoresistive sensor 701 is performed after the operational amplifier 703, the detection is normally open, a leakage current may be generated. It should be noted that, in the pressure sensing detection circuit as illustrated in FIG. 1, the input voltage signal is a DC (direct current) voltage signal.

At least one embodiment of the present disclosure provides a pressure sensing detection circuit, the pressure sensing detection circuit comprises: an excitation signal circuit, configured to output an alternating current voltage signal; a pressure sensing circuit, configured to sense a magnitude of an external pressure and output a detection voltage signal under excitation of the alternating current voltage signal; and a phase detection circuit, configured to detect a phase change value of the detection voltage signal and convert the phase change value into a voltage value. At least one embodiment of the present disclosure further provides a driving method and an electronic device corresponding to the above pressure sensing detection circuit.

The pressure sensing detection circuit is driven by using an alternating current (AC) voltage and therefore can reduce power consumption. Also, detecting the phase change value to detect the magnitude of the external pressure applied can reduce the pressure detection error, and can improve the detection accuracy.

In the following, some examples are given for explanation.

Figure 2:
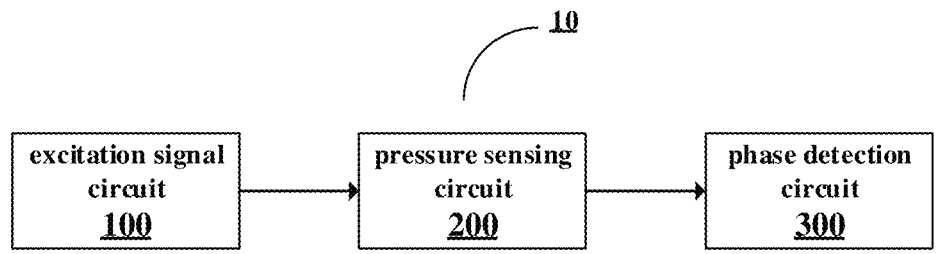
FIG. 2 is a schematic diagram of a pressure sensing detection circuit according to an embodiment of the present disclosure.

A pressure sensing detection circuit is applied in one embodiment of the present disclosure, as illustrated in FIG. 2, the pressure sensing detection circuit 10 comprises: an excitation signal circuit 100, configured to output an alternating current voltage signal; a pressure sensing circuit 200, configured to sense a magnitude of an external pressure and output a detection voltage signal under excitation of the alternating current voltage signal; and a phase detection circuit, configured to detect a phase change value of the detection voltage signal and convert the phase change value into a voltage value.

In this embodiment, the pressure sensing detection circuit is driven by an AC voltage, and the power consumption can be reduced compared with direct current (DC) voltage. At the same time, detecting the value of the phase change to detect the size of the external pressure can reduce the pressure detection error and can improve the detection accuracy.

Figure 3:
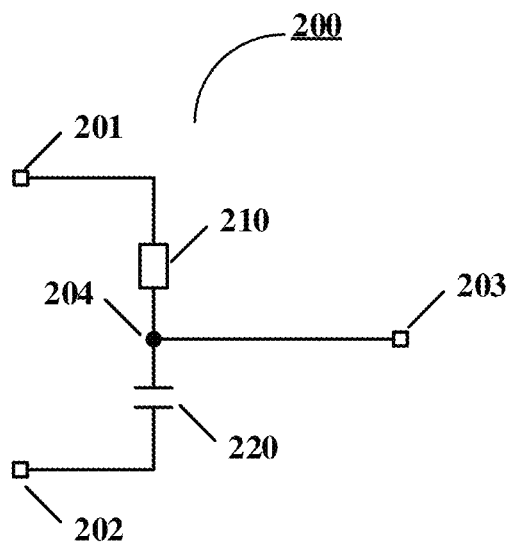
FIG. 3 is a circuit diagram of a pressure sensing circuit according to an example of an embodiment of the present disclosure.

For instance, as illustrated in FIG. 3, in one example of the pressure sensing circuit, the pressure sensing circuit 200 may include a first voltage input terminal 201, a second voltage input terminal 202, a detection voltage output terminal 203, a pressure sensitive resistor 210, and a capacitor 220.

A first terminal of the pressure sensitive resistor 210 is connected to the first voltage input terminal 201, and a first terminal of the capacitor 220 is connected to the second voltage input terminal 202. A second terminal of the pressure sensitive resistor 210, a second terminal of the capacitor 220 and a detecting voltage output terminal 203 are all connected to a first node 204. The detection voltage output terminal 203 outputs a detection voltage signal.

The pressure sensitive resistor 210 experiences changes in resistivity when subjected to external pressure, and for instance, an electrical signal output which is proportional to the pressure change is obtained by the detection voltage output terminal 203. For instance, the material of the pressure sensitive resistor can include polyvinylidene fluoride (PVDF), but an embodiment of the present disclosure includes and is not limited to the selection for the material of the pressure sensitive resistor.

In this example, no switching circuit is disposed in the pressure sensing circuit, so the pressure sensing circuit according to this example is suitable for use alone.

Figure 4:
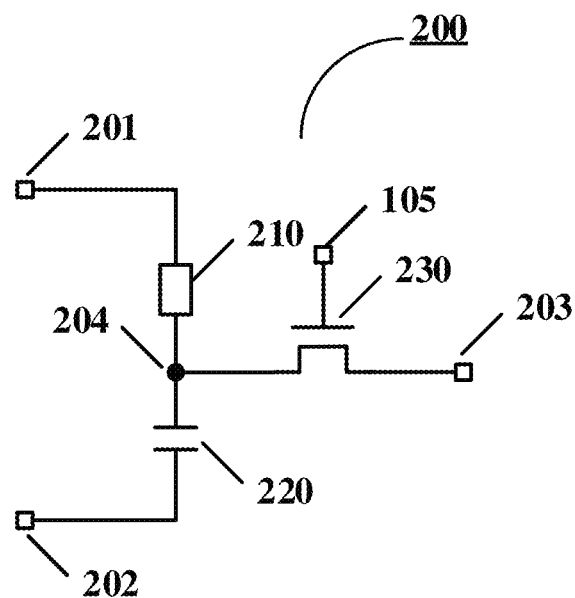
FIG. 4 is a circuit diagram of a pressure sensing circuit according to another example of an embodiment of the present disclosure.

For instance, as illustrated in FIG. 4, in another example of the pressure sensing circuit, this example differs from the previous example in that the pressure sensing circuit 200 can further include a switch circuit 230. A first terminal of the switch circuit 230 is connected to the first node 204, a second terminal of the switch circuit 230 is connected to the detection voltage output terminal 203, and a control terminal 105 of the switch circuit 230 is configured to receive a control signal, for instance, is coupled to a control circuit or a control chip.

For instance, as illustrated in FIG. 4, in a specific example, the switch circuit 230 may be a transistor. It should be noted that the switch circuit 230 employed in the embodiment of the present disclosure may be a thin film transistor, a field effect transistor, or other switching devices with the same or similar characteristics. A source electrode and a drain electrode of the transistor used herein can be structurally symmetrical, so the source electrode and the drain electrode can be structurally indistinguishable. For instance, a first terminal of the switch circuit 230 in the embodiment of the present disclosure can be the source electrode, and the second terminal can be the drain electrode; alternatively, the first terminal of the switch circuit 230 is the drain electrode and the second terminal is the source electrode; and the control terminal 105 of the switch circuit 230 is a gate electrode. Simultaneously, the transistor can be N-type or P-type, which is not limited in the embodiments of the present disclosure.

The pressure sensing circuit 200 according to this example can be disposed in an array structure of a display device or a touch panel. The control terminal 105 of each switch circuit 230 can be connected to a control line to receive a control signal. The pressure sensing circuit 200 is configured to be turned on or off under control of the control signal to turn on or off the detection function. The provision of the switch circuit 230 can allow the pressure sensing detection circuit 10 comprising the pressure sensing circuit 200 to turn on the detection function when needed or turn on the detection function according to a set frequency, so as to reduce the power consumption.

Figure 5:
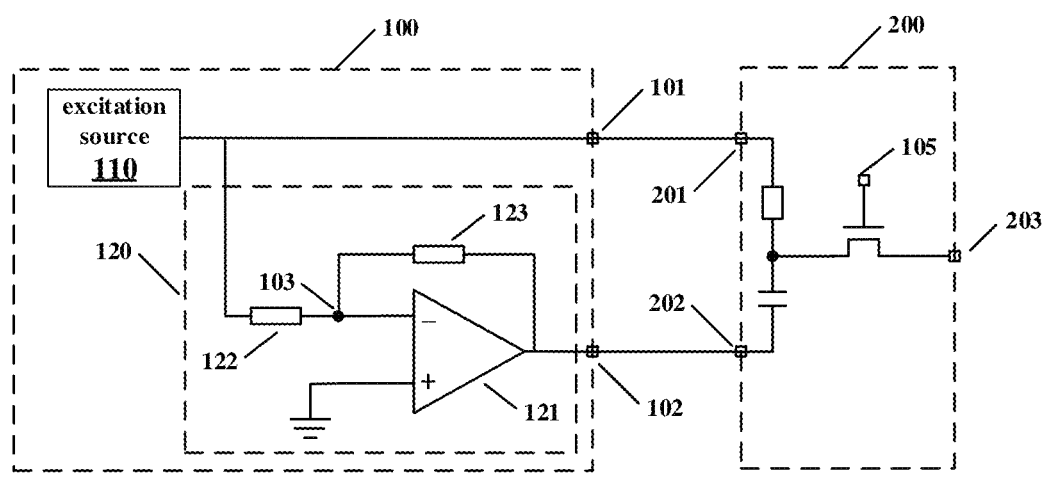
FIG. 5 is a circuit diagram of connection between an excitation signal circuit and a pressure sensing circuit according to an example of an embodiment of the present disclosure.
Figure 6:
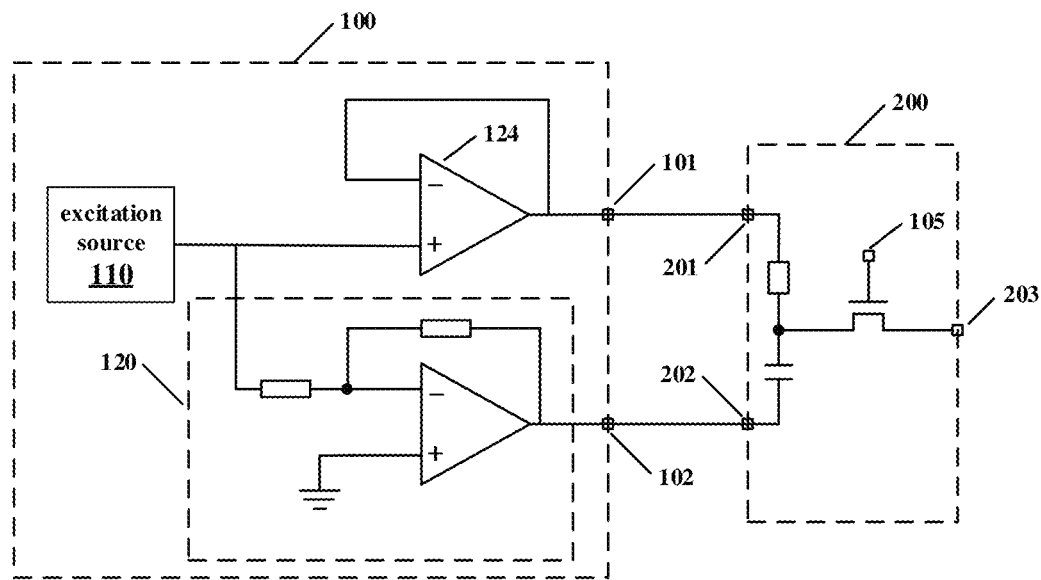
FIG. 6 is a circuit diagram of connection between an excitation signal circuit and a pressure sensing circuit according to another example of an embodiment of the present disclosure.

For instance, as illustrated in FIG. 5 and FIG. 6, in one example of the excitation signal circuit, the excitation signal circuit 100 includes an excitation source 110, an inversion circuit 120, a first voltage output terminal 101 and a second voltage output terminal 102.

For instance, the excitation source 110 is configured to output an excitation AC voltage signal, for instance, the AC voltage signal is U/2. The first voltage output terminal 101 outputs a first alternating voltage alternating current (AC) signal to the first voltage input terminal 201.

For instance, as illustrated in FIG. 5, the first voltage output terminal 101 and the excitation source 110 are directly connected, so that the first AC voltage signal output by the first voltage output terminal 101 and the excitation AC voltage signal U/2 output by the excitation source 110 are same as each other, That is, the first AC voltage signal is also U/2.

For another instance, as illustrated in FIG. 6, a second operational amplifier 124 can be disposed between the excitation source 110 and the first voltage output terminal 101. A non-inverting input terminal of the second operational amplifier 124 is connected to the excitation source 110, an inverting input terminal of the second operational amplifier 124 is connected to an output terminal of the second operational amplifier 124, and the output terminal of the second operational amplifier 124 is connected to the first voltage input terminal 201.

The second operational amplifier 124 can realize the function of a voltage follower by the connection as illustrated in FIG. 6, and the output voltage can follow the variation of the input voltage. Therefore, the first AC voltage signal output by the first voltage output terminal 101 and the AC voltage signal U/2 output by the excitation source 110 are same as each other, that is, the first AC voltage signal is also U/2.

It should be noted that the voltage follower has characteristics of high input impedance and low output impedance, and therefore generally can be used to be as a buffer level in an electric circuit.

For instance, as illustrated in FIG. 5 and FIG. 6, an input terminal of the inverter circuit 120 is connected to the excitation source 110, and the output terminal of the inverter circuit 120 is connected to the second voltage output terminal 102 so as to output a second AC voltage signal. For instance, after the AC voltage signal U/2 output by the excitation source 110 is inverted by the inverter circuit 120, the second AC voltage signal output from the second voltage output terminal 102 is −U/2. The second voltage output 102 and the second voltage input 202 are connected.

In this example, as illustrated in FIG. 5 and FIG. 6, the excitation signal circuit 100 outputs a first AC voltage signal U/2 and a second AC voltage signal −U/2 through the first voltage output terminal 101 and the second voltage output terminal 102, the first AC voltage signal U/2 and the second AC voltage signal −U/2 are respectively input to the pressure sensing circuit 200 through the first voltage input terminal 201 and the second voltage input terminal 202, that is, the total voltage drop of the AC voltage signal input to the pressure sensing circuit 200 is U. By applying two AC voltage signals that are opposite in phase to each other at two input terminals of the pressure sensing circuit 200, the detection voltage output terminal 203 of the pressure sensing circuit 200 can output a phase change detection voltage signal $U_S$.

For another example, as illustrated in FIG. 5 and FIG. 6, in a specific example, the inverter circuit 120 can comprise a first operational amplifier 121, a first resistor 122, and a second resistor 123. A first terminal of the first resistor 122 is connected to the excitation source 110, and a second terminal of the first resistor 122, a first terminal of the second resistor 123 and an inverting input terminal of the first operational amplifier 121 are connected to a second node 103. The second terminal of the second resistor 123 is connected to an output terminal of the first operational amplifier 121. A non-inverting input terminal of the first operational amplifier 121 is grounded, and an output terminal of the first operational amplifier 121 is connected to the second voltage input terminal 202.

It should be noted that, in the case that the second AC voltage signal output by the second voltage output terminal 102 is −U/2, if the AC voltage signal output from the excitation source 110 is U/2, the resistance of the first resistor 122 and the resistance of the second resistor 123 should be equal to each other. In addition, the embodiments of the present disclosure may include and are not limited to the abovementioned implementation of the inverter circuit 120, and the other inverter circuits only need to have the function of inverting the AC voltage signal output by the excitation source 110.

Figure 7:
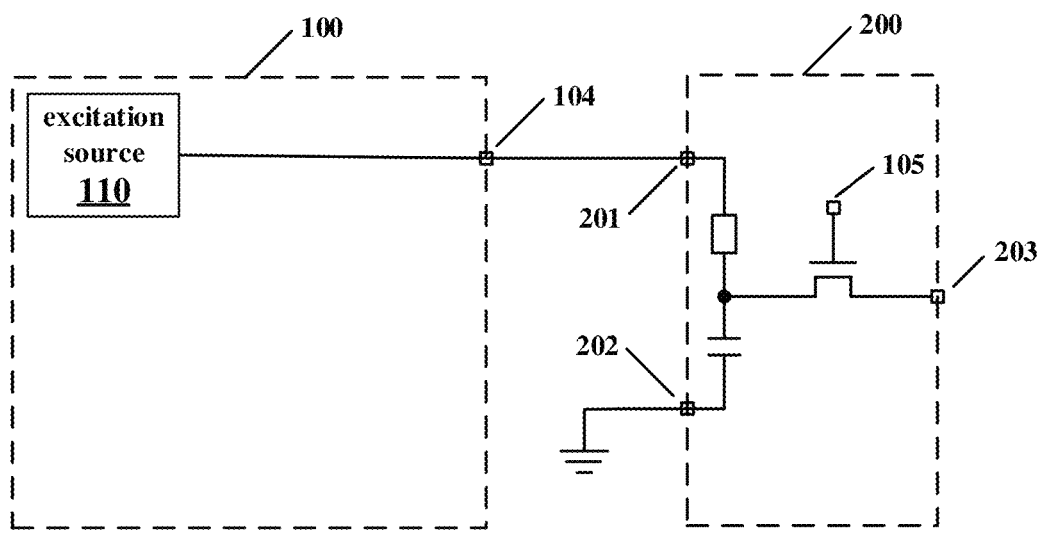
FIG. 7 is a circuit diagram of connection between an excitation signal circuit and a pressure sensing circuit according to another example of an embodiment of the present disclosure.
Figure 8:
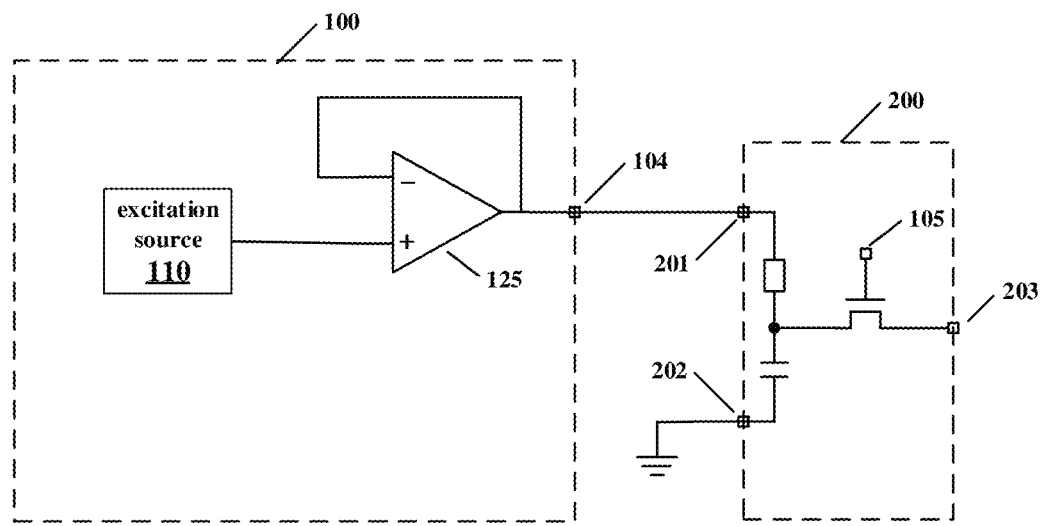
FIG. 8 is a circuit diagram of connection between an excitation signal circuit and a pressure sensing circuit according to further still another example of an embodiment of the present disclosure.

For instance, as illustrated in FIG. 7 and FIG. 8, in another example of the excitation signal circuit, the excitation signal circuit 100 includes an excitation source 110 and a voltage output terminal 104. The excitation source 110 is configured to output an AC voltage signal to the voltage output terminal 104, and the voltage output terminal 104 is connected to the first voltage input terminal 201. For instance, the AC voltage signal output by the excitation source 110 is U, in this example, the second voltage input terminal 202 of the pressure sensing circuit 200 is grounded, and therefore, the total voltage drop of the AC voltage signal applied to the pressure sensing circuit 200 is also U.

For instance, as illustrated in FIG. 7, the voltage output terminal 104 can be directly connected to the excitation source 110, such that the AC voltage signal output by the voltage output terminal 104 and the AC voltage signal U output by the excitation source 110 are same as each other.

For another instance, as illustrated in FIG. 8, a third operational amplifier 125 can be disposed between the excitation source 110 and the voltage output terminal 104. Similar to the illustration in FIG. 6, a non-inverting input terminal of the third operational amplifier 125 is connected to the excitation source 110, an inverting input terminal of the third operational amplifier 125 is connected to the output terminal of the third operational amplifier 125, and an output terminal of the third operational amplifier 125 is connected to the first voltage input 201 of the pressure sensing circuit 200.

It should be noted that, the operation and technical effects of the third operational amplifier 125 are the same as those of the second operational amplifier 124 as illustrated in FIG. 6, and details are not described here again.

In this example, as illustrated in FIG. 7 and FIG. 8, the excitation signal circuit 100 outputs the AC voltage signal U through the voltage output terminal 104, the AC voltage signal U is input to the pressure sensing circuit 200 through the first voltage input terminal 201; also, the second voltage input terminal 202 of the circuit 200 is grounded so that the total voltage drop of the AC voltage signal applied to the pressure sensing circuit 200 is U. By inputting an AC voltage signal with a total voltage drop U across both input terminals of the pressure sensing circuit 200, the detection voltage output end 203 of the pressure sensing circuit 200 can output a phase change detection voltage signal $U_S$.

It should be noted that, in contrast to the previous example that an inverted AC voltage signal is applied to two input terminals of the pressure sensing circuit 200, the AC voltage signal U is input to only the first voltage input terminal 201 of the pressure sensing circuit 200 in this example, and the second voltage input terminal 202 is grounded. Therefore, in this example, the AC voltage signal applied to the pressure sensing circuit 200 comprise a DC component, and the DC blocking process should be performed during subsequent processing.

Figure 9:
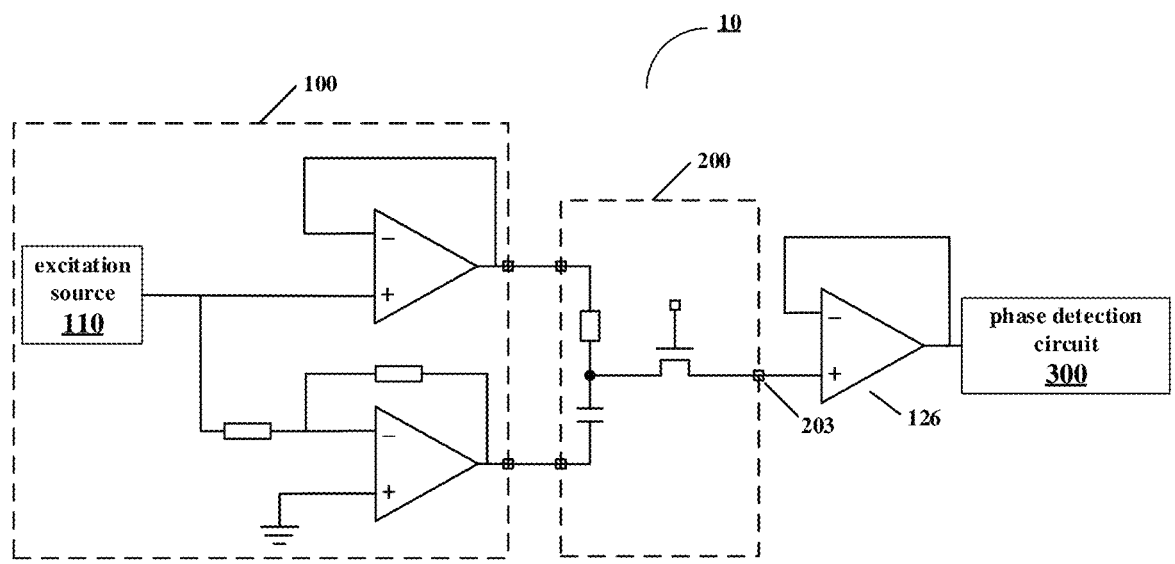
FIG. 9 is a schematic diagram of a pressure sensing detection circuit according to an example of an embodiment of the present disclosure.

In at least one embodiment of the present disclosure, for instance, as illustrated in FIG. 9, the pressure sensing detection circuit 10 further includes a fourth operational amplifier 126. A non-inverting input terminal of the fourth operational amplifier 126 is connected to the detection voltage output terminal 203, an inverting input terminal of the fourth operational amplifier 126 is connected to an output terminal of the fourth operational amplifier 126, and the output terminal of the fourth operational amplifier 126 is connected to an input terminal of the phase detection circuit 300.

The fourth operational amplifier 126 is similar in connection to the second operational amplifier 124 as illustrated in FIG. 6 and the third operational amplifier 125 as illustrated in FIG. 8, and the fourth operational amplifier 126 can also implement the function of voltage follower, transmitting the detection voltage signal $U_S$ output by the voltage output terminal 203 to the phase detection circuit 300 at the rear end. Also, because the voltage follower has characteristic of high input impedance and low output impedance, in the circuit illustrated in FIG. 9, the fourth operational amplifier 126 also has an impedance matching function.

Figure 10:
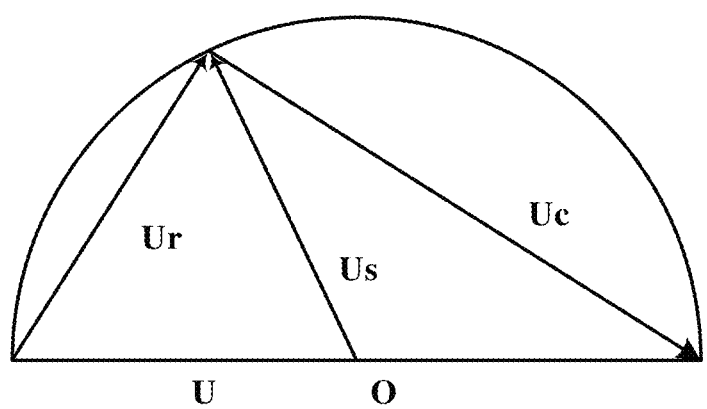
FIG. 10 is a schematic diagram of voltage phasor of a pressure sensing circuit according to an embodiment of the present disclosure.

For instance, by analyzing each phasor component of the pressure sensing circuit 200 illustrated in FIG. 9, a voltage phasor diagram as illustrated in FIG. 10 can be obtained. For instance, the voltage signals applied to the two input terminals of the pressure sensing circuit 200 are respectively U/2 and −U/2 in the condition that the AC voltage signal output by the excitation source 110 is U/2, and the total pressure drop applied to the pressure sensing circuit 200 is U.

Figure 11:
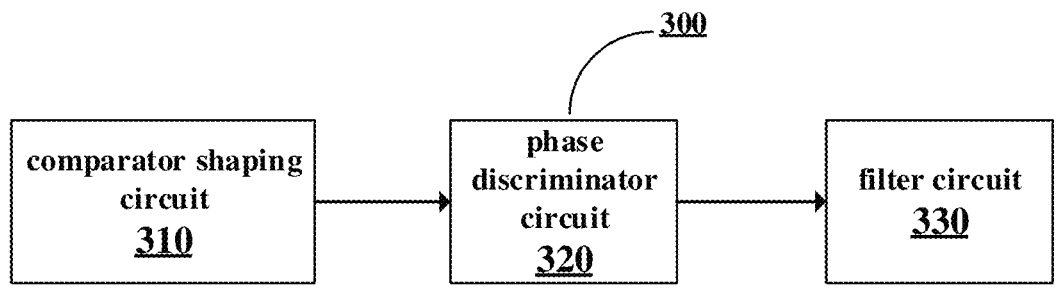
FIG. 11 is a schematic diagram of a phase detection circuit according to an embodiment of the present disclosure.

As illustrated in FIG. 10, in analyzing each phasor component in the pressure sensing circuit 200, the voltage phasor applied to the varistor 210 is denoted as Ur, and the voltage phasor applied to the capacitor 220 is denoted as $U_C$. As described above, the detection voltage output terminal 203 outputs the detection voltage signal $U_S$, as illustrated in FIG. 10, in theory, $U_S$ is a phasor an amplitude of which is a radius and having a certain radius. When resistance of the pressure sensitive resistor 210 is changed, the amplitude magnitude of the signal $U_S$ is constant and only the phase is changed, and therefore, the change of the phase of the signal $U_S$ can reflect the change of the resistance of the pressure sensitive resistor 210. For instance, as illustrated in FIG. 11, in one example of the phase detection circuit 300, the phase detection circuit 300 includes a comparator shaping circuit 310, a phase detection circuit 320 and a filter circuit 330 which are connected in series.

For instance, the AC voltage signal output by the excitation source 110 may be a sine wave signal, and in this case, the detection voltage signal $U_S$ output by the pressure sensing circuit 200 is also a sine wave signal, which includes the change of the resistance of the pressure sensitive resistor 210, specifically reflected in the phase change of the signal $U_S$. The detection voltage signal $U_S$ is input to the phase detection circuit 300 via the fourth operational amplifier 126. Firstly, the comparator shaping circuit 310 shapes the signal $U_S$ into a square wave signal, then the phase discrimination circuit 320 compares the square wave signal with a reference signal and converts the phase difference ψ therebetween to a high level signal, and it is finally averaged by the filter circuit 330 to be a voltage signal.

The phase detection circuit 300 can convert the phase change of the signal $U_S$ output by the pressure sensing circuit 200 to be a voltage signal, so as to obtain the resistance change amount across the pressure sensitive resistor 210. Then, through the inherent relationship between the resistance of the pressure sensitive resistor 210 and the external pressure, the magnitude of the external pressure on the pressure sensitive resistor 210 can be obtained.

It should be noted that the embodiments of the present disclosure are not limited to the implementation method of the phase detection circuit 300 described above, any other phase detection circuit may be used as long as it can detect the phase change of the detection voltage signal US output by the pressure sensing circuit 200.

Figure 12:
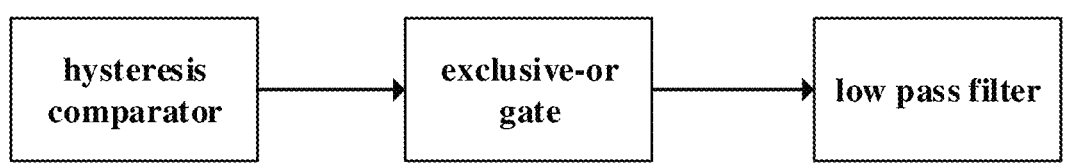
FIG. 12 is a schematic diagram of a specific implementation of the phase detection circuit as illustrated in FIG. 11.

For example, FIG. 12 shows one specific example of the phase detection circuit 300 as illustrated in FIG. 11, the comparator shaping circuit 300 comprises a hysteresis comparator, the phase discriminator 320 can comprise an exclusive-or gate, and correspondingly the filter circuit 330 can comprise a low pass filter.

Figure 13:
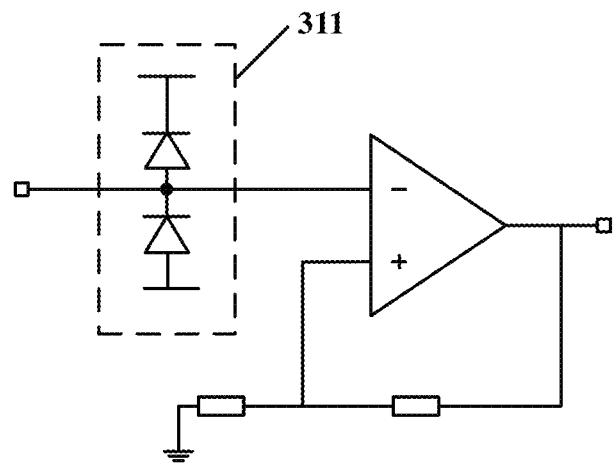
FIG. 13 is a schematic diagram of a hysteresis comparator.

For instance, FIG. 13 shows an exemplary hysteresis comparator, and the hysteresis comparator includes an operational amplifier and two resistors. A stabilivolt (e.g., zener diode) 311 may also be disposed at the inverting input terminal of the operational amplifier, the stabilivolt 311 may limit the amplitude of the input operational amplifier so as to protect the operational amplifier.

Figure 14:
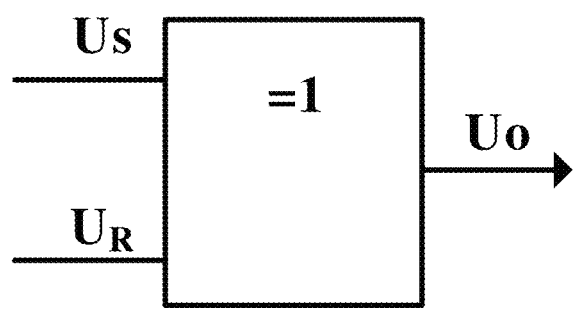
FIG. 14 is a schematic diagram of an exclusive-or gate.

For instance, FIG. 14 is a schematic diagram of an exclusive-or (XOR) gate, the exclusive-or gate has two input terminals, one input terminal is for inputting the detection voltage signal $U_S$ which has been shaped by the hysteresis comparator, and the other input terminal is supplied with a reference voltage signal $U_R$, for instance, the reference voltage signal $U_R$ may be the AC voltage signal U/2 output by the excitation source 110. It should be noted that the AC voltage signal U/2 output by the excitation source 110 also needs to be shaped into a square wave signal by the comparator shaping circuit 310 before the XOR gate is used as the reference voltage signal.

Figure 15:
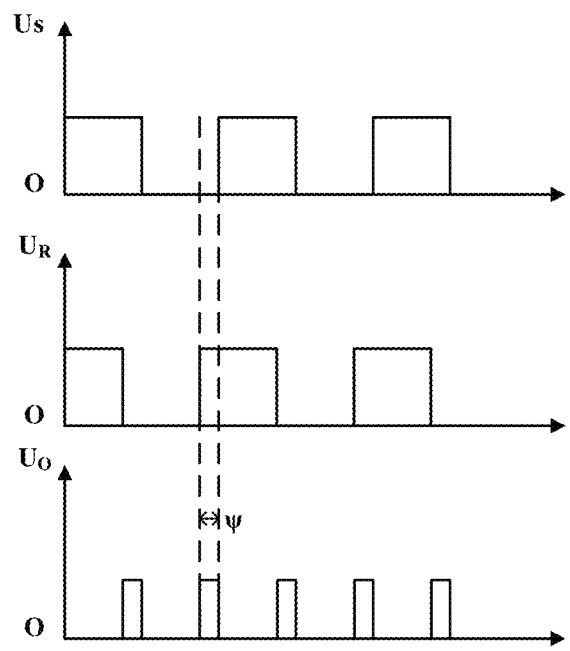
FIG. 15 is a schematic phase comparison waveform diagram of the exclusive-or gate.

For instance, FIG. 15 is a schematic diagram of the exclusive-or gate phase comparison waveform. As illustrated in FIG. 15, the detection voltage signal $U_S$ and the reference voltage signal $U_R$ that are input to the XOR gate have a certain phase difference ψ therebetween. After passing the XOR gate, when one of the input signals is at a high level and the other is at a low level, the output voltage signal $U_O$ is at a high level, and therefore, the output waveform is as illustrated in figure.

As illustrated in FIG. 15, the pulse width of the voltage signal $U_O$ output by the exclusive XOR gate is proportional to the phase difference ψ, and after the obtained voltage signal UO further passes the low pass filter as illustrated in FIG. 12, the obtained voltage signal and the phase difference ψ is directly proportional to each other; through standardization, the relationship between the voltage signal and the phase difference ψ can be obtained.

It should be noted that the phase detector circuit 320 is not limited to the implementation of the XOR gate described above, and for instance, the phase detector circuit may also be implemented by an RS flip-flop circuit.

In this embodiment of the present disclosure, the waveform of the AC voltage signal output by the excitation source 110 may further include a square wave, in this case, the back-end phase detection circuit 300 may not include the comparator shaping circuit 310, that is, the AC voltage signal input to the phase detection circuit 300 does not need to be shaped into a square wave.

In addition, the voltage signal output by the phase detection circuit is an analog signal, and the analog signal may also be converted into a digital signal by an AD conversion circuit before being further processed, which is not limited in the embodiment of the present disclosure.

Another embodiment of the present disclosure provides an electronic device, for instance, the electronic device can be a display device or a touch panel. For instance, the touch panel may be combined with other components such as a display panel to obtain a product having touch function.

Figure 16:
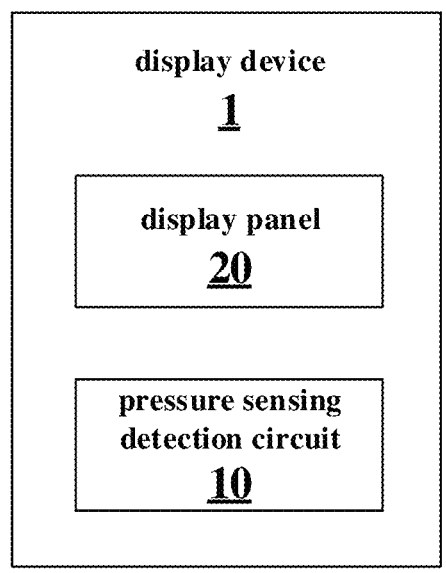
FIG. 16 is a schematic diagram of an electronic device according to an embodiment of the present disclosure.

For instance, in the case that the electronic device is a display device, as illustrated in FIG. 16, the display device 1 includes a display panel 20 and the pressure sensing detection circuit 10 according to any one of the above embodiments.

Figure 17:
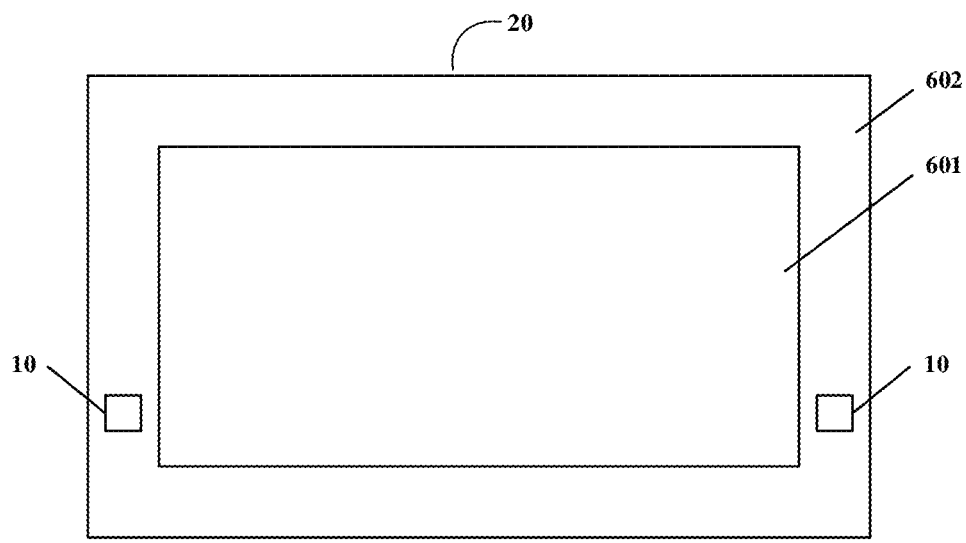
FIG. 17 is a schematic diagram of a pressure-sensitive detection circuit provided in the peripheral area.

For instance, as illustrated in FIG. 17, the display panel 20 includes a display area 601 and a peripheral area 602 surrounding the display area 601.

In one example of the present embodiment, as illustrated in FIG. 17, the pressure sensitive detection circuit 10 may be disposed in the peripheral region 602 of the display panel 20, in this case, the switch circuit 230 in the pressure sensing circuit 200 may not be provided, in this situation, the connection relationship of the pressure sensing circuit 200 is as illustrated in FIG. 3. For instance, a pressure sensitive detection circuit 10 may be disposed at the left edge or the right edge in the peripheral area 602 of the display panel 20 for implementing a specific sensing operation, such as a page turning operation in an electronic paper book. Compared to a touch operation, a pressure sensitive operation can prevent false triggering, because only when an external pressure to some extent is detected, the corresponding operation is triggered, so that diverse application scenarios can be realized. Certainly, more pressure sensitive detection circuits 10 may be disposed in the peripheral area 602 of the display panel 20, which is not limited in the embodiment of the present disclosure.

It should be noted that the pressure sensing detection circuit 10 as illustrated in FIG. 17 is only exemplary, and its size and proportion do not represent the real scale.

Figure 18:
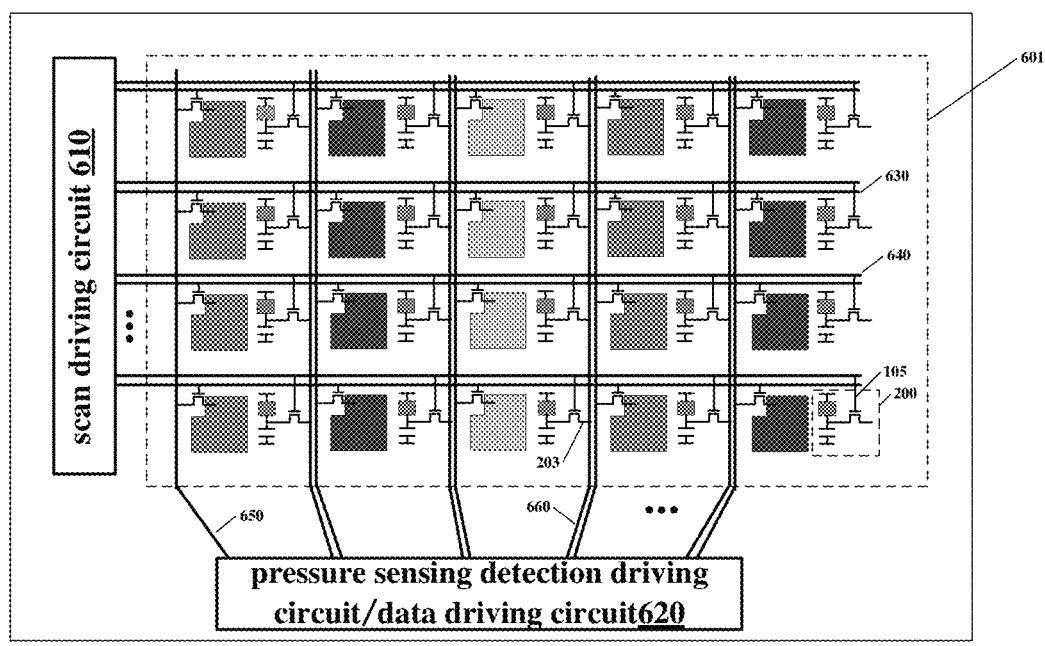
FIG. 18 is a first schematic diagram of the pressure sensing circuit which is distributed in an array in the display area.

For instance, as illustrated in FIG. 18, a plurality of pixel units arranged in an array is disposed in the display area 601 of the display panel, the gates of the transistors in each row of pixel units are connected to one gate line 630, and a plurality of the gate lines 630 are connected to the scan driving circuit 610 to achieve progressive scan display. The source electrode/drain electrodes of the transistors in each column of pixel units are connected to one data line 650, and a plurality of data lines 650 and the data driving circuit 620 are connected to realize data voltage driving.

For instance, the scan driving circuit 610 may be a GOA (Gate-driver on Array, which is gate drive circuit integrated on the array substrate) circuit or a scan driving chip, which is not limited in the embodiments of the present disclosure.

In another example of the present embodiment, as illustrated in FIG. 18, a pressure sensitive detection drive circuit is further included. It should be noted that, for instance, pressure sensitive detection drive circuit according to the embodiment of the present disclosure comprises an excitation signal circuit and a phase detection circuit, that is, the pressure sensitive detection drive circuit has a function of an excitation signal circuit and a phase detection circuit.

As illustrated in FIG. 18, the pressure sensing circuits 200 may be disposed in an interval area between adjacent pixel units in the display area 601, and also be distributed in an array. In this case, it is necessary to include the switch circuit in each of the pressure sensing circuits 200 and the connection relationship of each pressure sensing circuits 200 is as illustrated in FIG. 4. The control terminals 105 of each row of the pressure sensing circuits 200 are connected to one control line 640, and the control line 640 is connected to the scan driving circuit 610 for scan control.

The detection voltage output terminal 203 of each column of the pressure sensing circuits 200 is connected to one pressure sensitive detection line 660, and the pressure sensitive detection line 660 is connected to the pressure sensitive detection drive circuit, for instance, connected to a phase detection circuit in the pressure sensitive detection drive circuit. It should be noted that the two input terminals of each pressure sensing circuit 200 each need a lead wire which is connected to a pressure sensing detection drive circuit to receive the excitation signal, for instance, connected to the excitation signal circuit in the pressure sensing detection drive circuit, the lead wire is not illustrated figure.

It should be noted that in the embodiments of the present disclosure, the pressure sensitive detection driving circuit and the data driving circuit may be separately disposed, for instance, respectively as a single driving chip. The pressure sensitive detection drive circuit and the data drive circuit can be implemented in a same driving chip, that is, the data drive circuit also has the function of a pressure sensing detection drive circuit. The embodiment of the present disclosure is not limited thereto.

In this example, the pressure sensing circuits of the pressure sensitive detection circuit are disposed in the display area of the display panel and are distributed in an array. Scanning and controlling of the pressure sensing circuit of each row to be turned on or off is performed by the scan driving circuit; providing of the excitation signal to the pressure sensing circuit is performed through the pressure sensing detection driving circuit, and processing of the detection voltage signal output by the pressure sensing circuit is conducted. In this way, pressure sensing operation can be implemented in the display area, and various user needs can be met in combination with other touch operations. Furthermore, through scan control of the scan driver, the pressure sensing circuit can be allowed to be turned on when needed so as to save electronic energy, thereby reduce power consumption.

Figure 19:
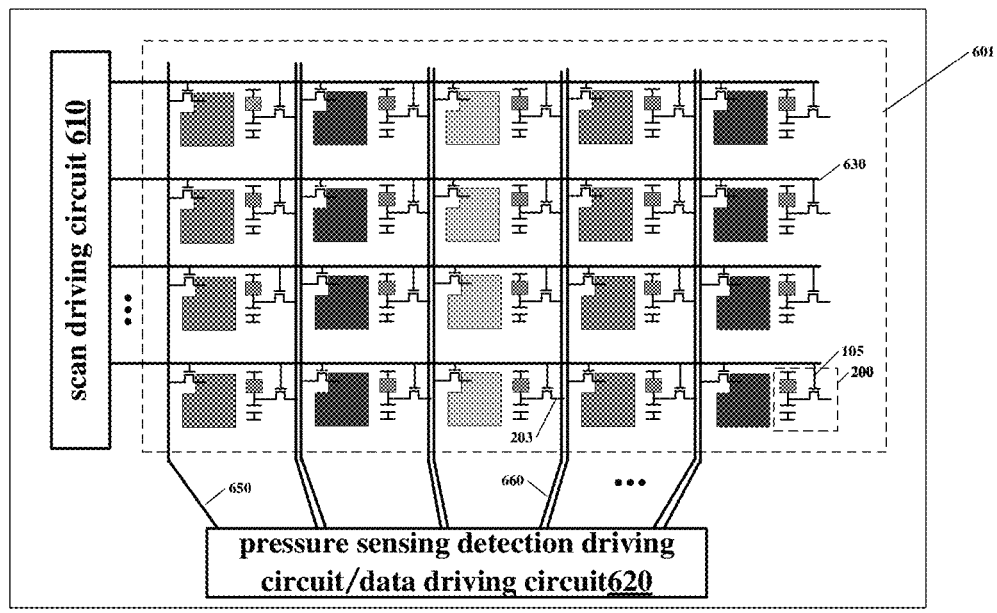
FIG. 19 is a second schematic diagram of the pressure sensing circuit which is distributed in an array in the display area.

In another example of the present embodiment, as illustrated in FIG. 19, the present example differs from the previous example in that no control line is provided, but the control terminals 105 of the pressure sensing circuits of each row are connected to the corresponding gate line 630, that is, share the gate line with pixel units in the same row. In this way, the wiring of one control line can be reduced for each row in the limited display area of the display panel, so as to increase the product integration degree, increase the aperture ratio of the display, and save the process cost. The technical effect of this example can refer to the corresponding description in the previous example, which is not described herein again.

It should be noted that the display device in this embodiment may be any display product or components with display function such as a liquid crystal panel, a liquid crystal television, a display, an OLED panel, an OLED television, an electronic paper, a cell phone, a tablet computer, a notebook computer, a digital photo frame, a navigator, etc.

In addition, the pressure sensing detection circuit provided by the embodiment of the present disclosure may be disposed in a display device, and can be disposed in a product or a component without display function, for instance, can be disposed in a touch panel of a notebook computer to implement pressure sensing operation, it can also be disposed in other products or components that require pressure sensing operation, which is not limited in the present disclosure.

Figure 20:
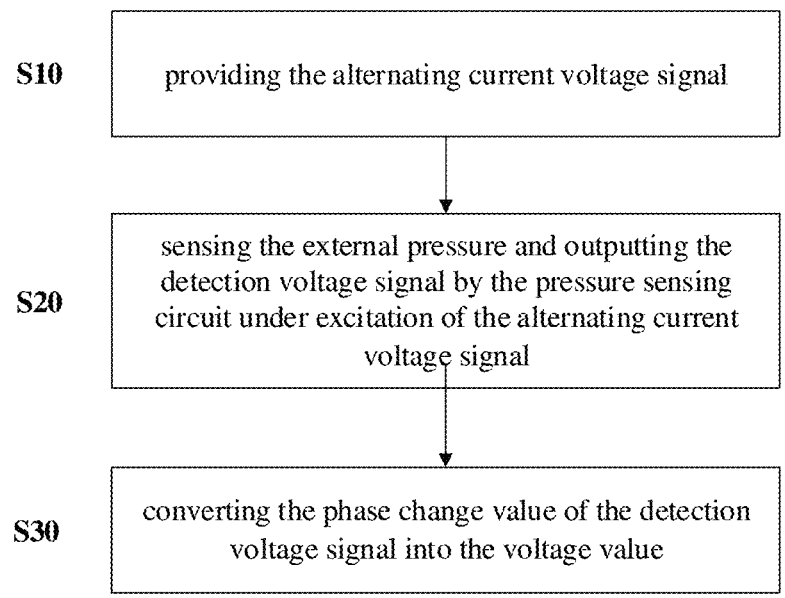
FIG. 20 is a schematic flowchart of a driving method according to an embodiment of the present disclosure.

Another embodiment of the present disclosure provides a method for driving any of the pressure sensing detection circuits. As illustrated in FIG. 20, the method includes the following operations.

S10: providing the alternating current voltage signal;

S20: sensing the external pressure and outputting the detection voltage signal by the pressure sensing circuit under excitation of the alternating current voltage signal; and S30: converting the phase change value of the detection voltage signal into the voltage value.

For instance, in step S10, alternating voltage signals U/2 and −U/2 which are inverse to each other can be provided. For instance, two AC voltage signals U/2 can be output by an excitation source, and one AC voltage signal U/2 passes through an inversion circuit to output an AC voltage signal −U/2. In addition, an AC voltage signal U can also be provided directly by an excitation source. The embodiment of the present disclosure is not limited to the above examples.

For instance, in step S20, the resistivity of the pressure sensitive resistor in the pressure sensing circuit changes under the effect of external pressure. In the case that the pressure sensing circuit is excited by the above AC voltage signal, the output detection voltage signal includes the change of the resistance of the pressure sensitive resistor, which is specifically embodied in the phase change of the detection voltage signal.

For instance, in step S30, the phase change value of the detection voltage signal is converted into a voltage value. For instance, the phase detection function can be realized by the phase detection circuit illustrated in FIG. 11. Through the phase detection circuit, the phase change value of the detection voltage signal can be converted into a voltage value, so that the variation of the resistance value of the pressure sensitive resistor can be obtained. Then through the inherent relationship between the resistance of the pressure sensitive resistor and the external pressure, the magnitude of the external pressure applied on the pressure sensitive resistor resistance can be obtained.

The driving method provided in this embodiment adopts the AC voltage to drive, which can reduce the power consumption compared with the DC voltage. Simultaneously, detecting of the magnitude of the external pressure by detecting the value of the phase change can reduce the pressure detection error and improve the detection accuracy.

The described above are only specific embodiments of the present disclosure, and the present disclosure is not limited thereto. The scope of the present disclosure is defined by the claims.

What is claimed is:

1. A pressure sensing detection circuit, comprising:
an excitation signal circuit, configured to output an alternating current voltage signal;
a pressure sensing circuit, configured to sense a magnitude of an external pressure and output a detection voltage signal under excitation of the alternating current voltage signal;
a phase detection circuit, configured to detect a phase change value of the detection voltage signal and convert the phase change value into a voltage value; and
a fourth operational amplifier, wherein a non-inverting input terminal of the fourth operational amplifier is connected to the detection voltage output terminal, an inverting input terminal of the fourth operational amplifier is connected to an output terminal of the fourth operational amplifier, and the output terminal of the fourth operational amplifier is connected to an input terminal of the phase detection circuit.

2. The pressure sensing detection circuit according to claim 1, wherein the pressure sensing circuit comprises a first voltage input terminal, a second voltage input terminal, a detection voltage output terminal, a pressure sensitive resistor, and a capacitor,
a first terminal of the pressure sensitive resistor is connected to the first voltage input terminal, a first terminal of the capacitor is connected to the second voltage input terminal, a second terminal of the pressure sensitive resistor, a second terminal of the capacitor are connected to a first node, and the detection voltage output terminal outputs the detection voltage signal.

3. The pressure sensing detection circuit according to claim 2, wherein the detection voltage output terminal is connected to the first node.

4. The pressure sensing detection circuit according to claim 2, wherein the pressure sensing circuit further comprises a switch circuit,
a first terminal of the switch circuit is connected to the first node, a second terminal of the switch circuit is connected to the detection voltage output terminal, and a control terminal of the switch circuit is configured to receive a control signal.

5. The pressure sensing detection circuit according to claim 1, wherein the excitation signal circuit comprises an excitation source, an inversion circuit, a first voltage output terminal and a second voltage output terminal,
the excitation source is configured to output an excitation alternating current voltage signal,
the first voltage output terminal outputs a first alternating current voltage signal to the first voltage input terminal,
an input terminal of the inverter circuit is connected to the excitation source, an output terminal of the inverter circuit is connected to the second voltage output terminal so as to output a second alternating current voltage signal, and the second voltage output terminal is connected to the second voltage input terminal.

6. The pressure sensing detection circuit according to claim 5, wherein the inversion circuit comprises a first operational amplifier, a first resistor and a second resistor,
a first terminal of the first resistor is connected to the excitation source, and a second terminal of the first resistor, a first terminal of the second resistor and an inverting input terminal of the first operational amplifier are connected to a second node,
the second terminal of the second resistor is connected to an output terminal of the first operational amplifier,
a non-inverting input terminal of the first operation amplifier is grounded, and an output terminal of the first operation amplifier is connected to the second voltage input terminal.

7. The pressure sensing detection circuit according to claim 6, wherein the excitation signal circuit further comprises a second operational amplifier, a non-inverting input terminal of the second operational amplifier is connected to the excitation source, an inverting input terminal of the second operational amplifier is connected to a output terminal of the second operational amplifier, and the output terminal of the second operational amplifier is connected to the first voltage input terminal.

8. The pressure sensing detection circuit according to claim 1, wherein the excitation signal circuit comprises an excitation source and a voltage output terminal, the excitation source is configured to output an excitation alternating current voltage signal to the voltage output terminal, the voltage output terminal is connected to the first voltage input terminal, and the second voltage input terminal is grounded.

9. The pressure sensing detection circuit according to claim 8, wherein the excitation signal circuit further comprises a third operational amplifier, a non-inverting input terminal of the third operational amplifier is connected to the excitation source, an inverting input terminal of the third operational amplifier is connected to an output terminal of the third operational amplifier, and the output terminal of the third operational amplifier is connected to the first voltage input terminal.

10. The pressure sensing detection circuit according to claim 1, wherein the phase detection circuit comprises a comparator shaping circuit, a phase discriminator and a filter circuit which are connected in series.

11. The pressure sensing detection circuit according to claim 10, wherein the comparator shaping circuit comprises a hysteresis comparator, the phase discriminator comprises an exclusive-or gate, and the filter circuit comprises a low pass filter.

12. An electronic device, comprising the pressure sensing detection circuit according to claim 1.

13. The electronic device according to claim 12, further comprising a display panel, a scan driving circuit and a pressure sensing detection driving circuit, wherein the pressure sensing circuit comprises a first voltage input terminal, a second voltage input terminal, a detection voltage output terminal, a pressure sensitive resistor, a capacitor, and a switch circuit, a first terminal of the pressure sensitive resistor is connected to the first voltage input terminal, a first terminal of the capacitor is connected to the second voltage input terminal, a second terminal of the pressure sensitive resistor, a second terminal of the capacitor are connected to a first node, and the detection voltage output terminal outputs the detection voltage signal, a first terminal of the switch circuit is connected to the first node, a second terminal of the switch circuit is connected to the detection voltage output terminal, a control terminal of the switch circuit is configured to receive a control signal, the pressure sensing circuit is distributed in an array in the display area of the display panel, a control terminal of the switch circuit is connected to the scan driving circuit, and the detection voltage output terminal is connected to the pressure sensing detection driving circuit.

14. The electronic device according to claim 13, further comprising at least one gate line, wherein the control terminal of the switch circuit is connected to the at least one gate line.

15. A method of driving the pressure sensing detection circuit according to claim 1, comprising:

providing the alternating current voltage signal;

the pressure sensing circuit senses the external pressure and output the detection voltage signal under excitation of the alternating current voltage signal; and converting the phase change value of the detection voltage signal into the voltage value.

* * * * *